J. W. KENNEDY.
APPARATUS FOR DISPENSING SEMISOLID SUBSTANCES.
APPLICATION FILED MAR. 21, 1917.

1,250,470.

Patented Dec. 18, 1917.
6 SHEETS—SHEET 1.

Witness
Ernest Crocker

Inventor
J. W. Kennedy
By J. W. Bond
Attorney

J. W. KENNEDY.
APPARATUS FOR DISPENSING SEMISOLID SUBSTANCES.
APPLICATION FILED MAR. 21, 1917.

1,250,470.

Patented Dec. 18, 1917.
6 SHEETS—SHEET 4.

Witness
Ernest H. Crocker

Inventor
J. W. Kennedy.
By F. W. Bond
Attorney

UNITED STATES PATENT OFFICE.

JAMES W. KENNEDY, OF CANTON, OHIO.

APPARATUS FOR DISPENSING SEMISOLID SUBSTANCES.

1,250,470. Specification of Letters Patent. Patented Dec. 18, 1917.

Application filed March 21, 1917. Serial No. 156,480.

*To all whom it may concern:*

Be it known that I, JAMES W. KENNEDY, a citizen of the United States, residing at Canton, in the county of Stark and State of Ohio, have invented a new and useful Apparatus for Dispensing Semisolid Substances, of which the following is a specification.

My invention relates to improvements in apparatus for dispensing semi-solid substances and has more especial reference to an apparatus designed to dispense ice cream and the like and arranged to be placed beneath a counter of a soda fountain in a drug store or the like.

The object of the present invention is to provide an apparatus of the character referred to for dispensing semi-solid substances such as ice cream and the like, said apparatus being arranged to keep the ice cream or other substance contained therein in good condition and to sanitarily and economically dispense the substance therefrom.

A further object is to provide means for dispensing the ice cream or other substance contained in the machine in any desired quantity.

A still further object is to provide means for molding the ice cream or other substance into pleasing forms or shapes as the same is dispensed from the apparatus.

A still further object is to provide means for automatically cleaning the dispensing mechanism with each operation of the apparatus.

A still further object is the provision of an apparatus of the character referred to which is contained beneath the counter of a soda fountain or the like and which is easily and readily operated, the dispensing apparatus being located conveniently to the operator.

A still further object is the provision of means for presenting an advertising device to the view of the customer during the operation of the apparatus, the advertisements being changed or moved with each operation of the dispensing apparatus.

A still further object is the provision of an apparatus of this character in which the cream may be contained in a hardened or almost solid condition and at the same time easily handled by the dispensing mechanism of the apparatus.

A still further object is the provision of an apparatus of the character referred to in which the cream is kept out of contact with the outer air and dispensed from the apparatus without coming into contact with the hands of the operator, and in which the ice is kept at all times sealed from the outer air, thus making a great saving in the amount of ice used and dispensing with the inconvenience of frequently refilling the tank with ice.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the accompanying drawings:

Figure 1 is a front elevation of my improved apparatus for dispensing semi-solid substances and the like.

Fig. 15 is a detail perspective view of the mechanism upon the rear of the apparatus for operating the worm.

Fig. 16 is a detail perspective view of a portion of the mechanism upon the front of the apparatus for operating the worm.

Fig. 17 is a detail perspective view of the pawl and ratchet which forms a part of the plunger mechanism.

Fig. 19 is a detail perspective view of the operating lever which operates the ratchet mechanism for raising the plunger.

Similar numerals of reference indicate corresponding parts throughout the several figures of the drawings.

In the usual method of dispensing ice cream and the like it is customary to keep the ice cream in a covered can or receptacle, the cover being removed and a ladle or disher inserted into the can to remove the desired quantity of cream therefrom. It will be readily seen that this method is both unsanitary and wasteful and that the cream thus dispensed is often times not in the proper condition to be served. For instance when the can or container is opened dust and dirt may enter the can and be deposited upon the contents thereof and it is necessary with each operation for the hand of the person serving the cream to be inserted into the can or container. The frequent opening of the can or container also permits the outer atmosphere to contact with the cream, thus quickly melting the cream so that often times a quantity of cream in the bottom of the container becomes too soft to be served.

With my improved apparatus for dispensing ice cream or the like the cream is served from a sealed receptacle without coming into contact with the hands of the operator and without requiring the opening of the receptacle after the cream has been placed therein, until all of the cream has been served therefrom, thus obviating the disadvantages above enumerated.

Figures 1, 15, 16, 17, 19:
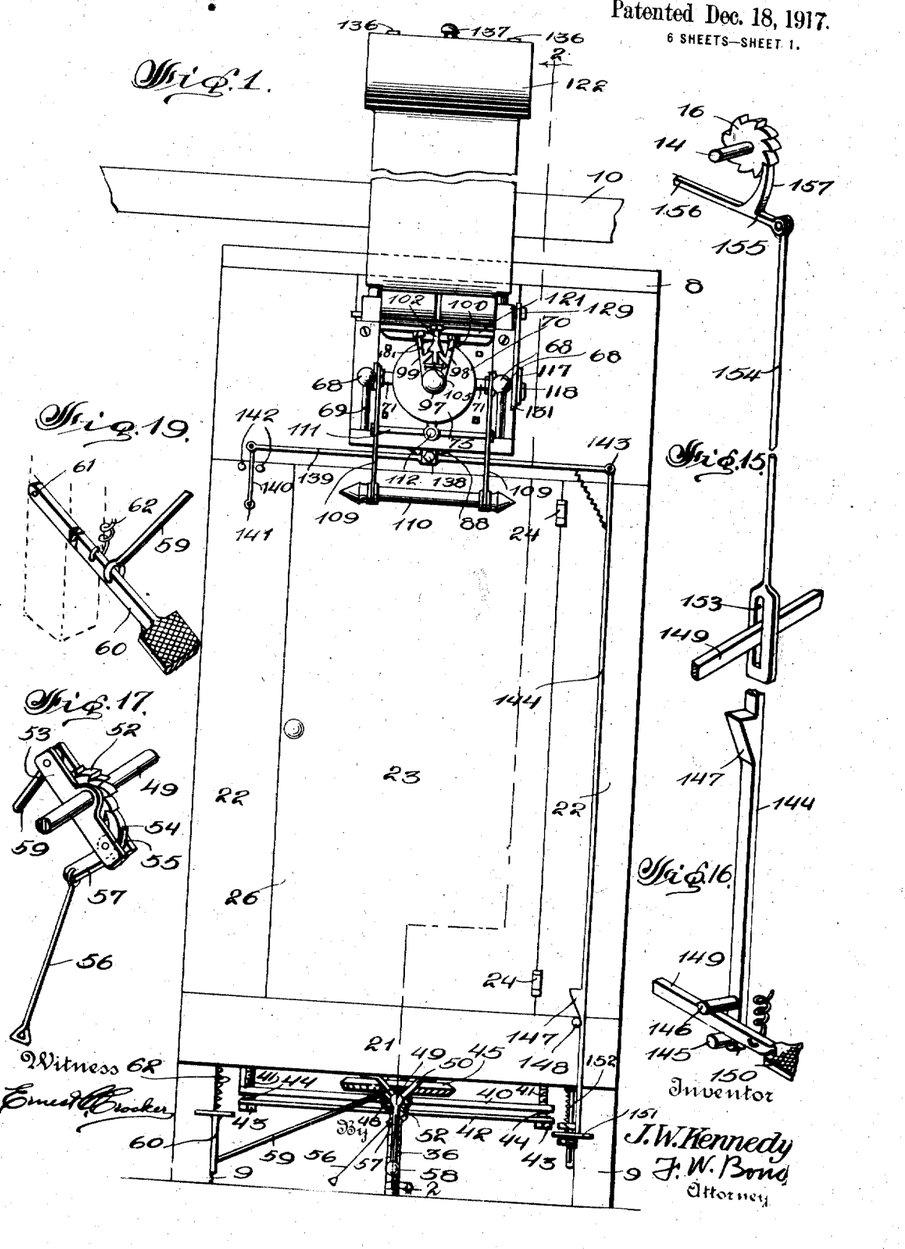
Figures 2, 12, 13, 18:
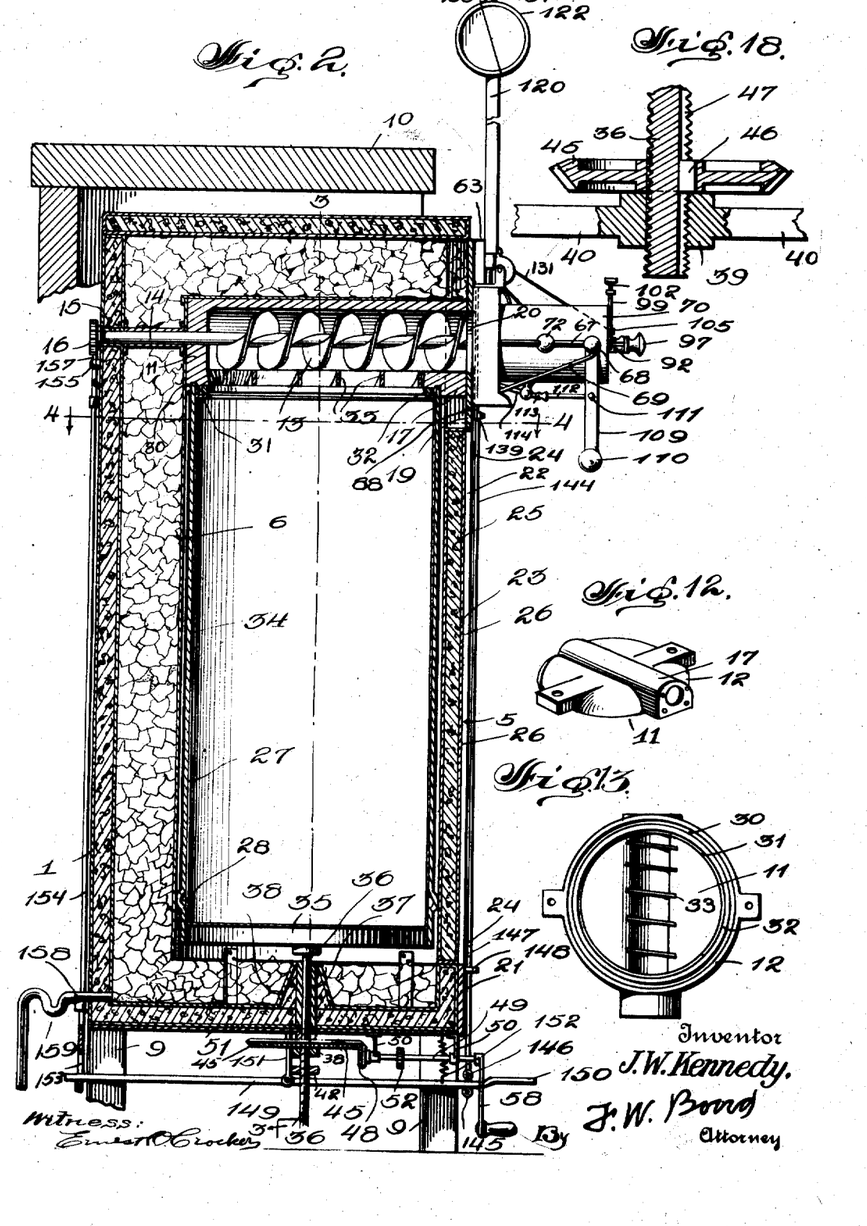
Fig. 2 is a section on the line 2—2, Fig. 1.
Fig. 12 is a detail perspective view of the cap upon the container.
Fig. 13 is a bottom plan view of the same.
Fig. 18 is a detail sectional view of a portion of the screw threaded shaft which operates the plunger, showing the gear wheel and nut.

Referring more especially to the construction illustrated in the accompanying drawings, the numeral 1 indicates the casing within which the container is located and comprises a double walled, cork-lined tank comprising the inner and outer walls 2 and 3, respectively, between which wall is located a layer 4 of cork or other suitable heat insulating material. This tank is open at its upper extremity and provided upon its forward face with the longitudinal cut-out portion 5 which forms a door way, which will be hereinafter described. Connected to each side of the door way and extending into the tank is a curved wall 6 preferably formed from a sheet of metal, said wall terminating at points spaced from the upper and lower extremities of the tank, supporting brackets being provided upon the lower wall of the tank for supporting said curved wall. The lid 8 for the tank is preferably made in two sections, each of which is composed of spaced, metallic walls between which a cork packing is located. The tank is designed to be supported by means of the legs 9 beneath a counter 10 of a soda fountain or the like as best shown in Fig. 2 of the drawings.

Located at the upper extremity of the curved wall 6 is the cap for the ice cream container, said cap being provided with the barrel portion 12, the extremity of which extends through the cut away portion 5 of the outer tank, a worm 13 being located through said barrel, the shaft 14 of said worm being journaled in the rear wall of the cap and extending through a suitable journal 15 in the rear wall of the tank, a ratchet wheel 16 being mounted upon the rear extremity of said shaft for a purpose which will be hereinafter described. The forward extremity of the worm extends into the neck 17 of the cap as best shown in Fig. 2 of the drawings. A sheet metal cover 18 is provided over the cap 11 and is soldered or otherwise suitably connected to the upper edge of the curved wall 6.

A relatively heavy plate 19 is connected to the front face of the tank 1 at the upper portion thereof and is provided with an aperture 20 of the diameter of the interior of the barrel 12, said aperture arranged to register with the interior of said barrel. A plate 21 of less width than the plate 19 extends across the lower portion of the front wall of said tank and upright plates 22 are located at each side of the cut-out portion 5, thus forming a door-way within which the door 23 is hingedly mounted by means of the hinges 24 connected to one of the plates 22, said door being formed of spaced walls between which cork packing 25 is located, a relatively heavy plate 26 being connected to the outer face of said door in order to give the front of the tank or casing a finished appearance.

The container 27 is formed of metal of cylindrical form and open at both ends, an annular rib 28 being formed near the lower end thereof, said rib being arranged to be engaged by the locking cams 29, which are pivotally mounted upon the curved wall 6 and arranged to support the container within the compartment formed by said curved wall, the upper extremity of the container being arranged to be seated within an annular groove 30 formed in the under surface of the cap 11. An inwardly disposed annular ring 31 is provided upon the interior of the container near the upper extremity thereof for a purpose hereinafter described, and is arranged to contact with the gasket 32, which is located within a suitable groove in the cap 11. Knives 33 are located across the under, open portion of the cap 11, beneath the worm 13, said knives being located at approximately the angle of the blades upon the worm. The ice cream is contained within a cylindrical paper sack 34 of substantially the diameter of the interior of the container 27 and is arranged to be placed within said container, as best shown in Fig. 2 of the drawings.

Figures 3, 14:
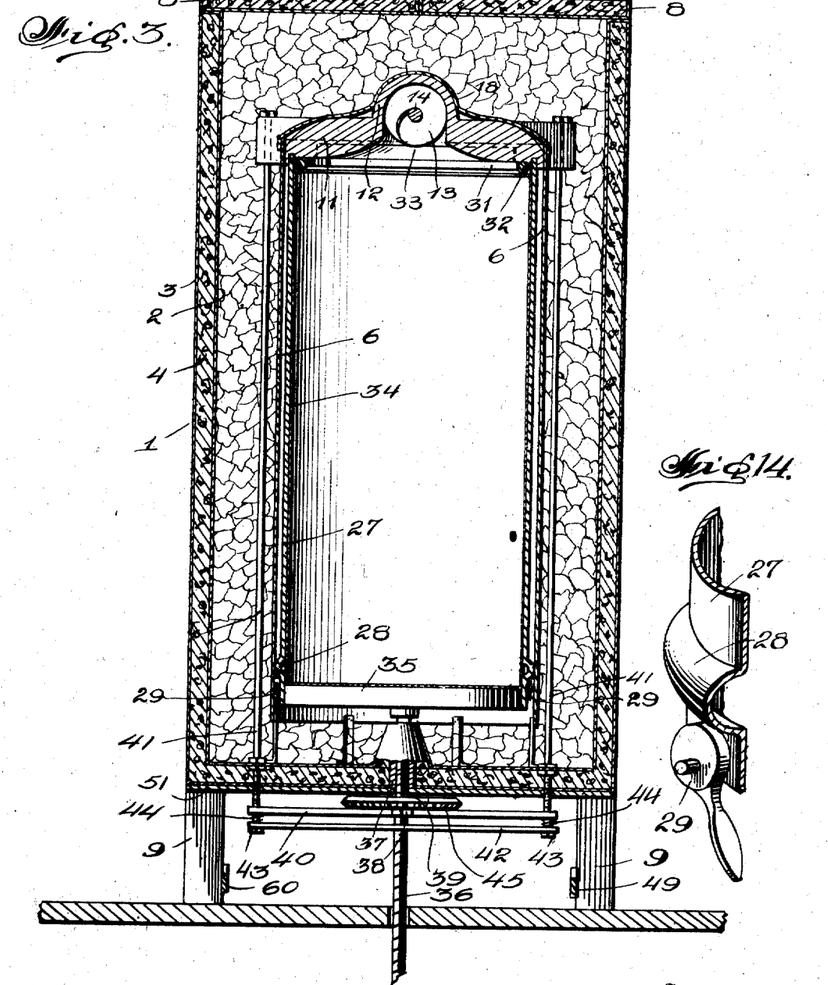
Fig. 3 is a section on the line 3—3, Fig. 2.
Fig. 14 is a detail perspective view of one of the locking cams which hold the container in position.
Figure 4:
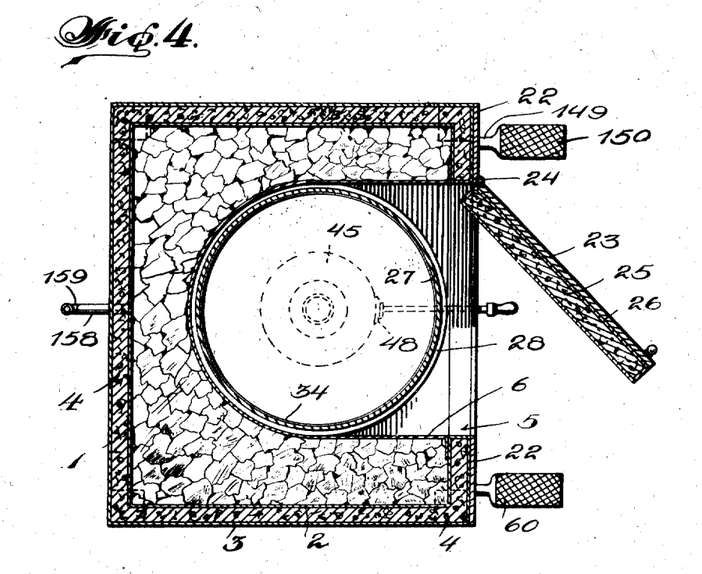
Fig. 4 is a section on the line 4—4, Fig. 2.
Figure 5:
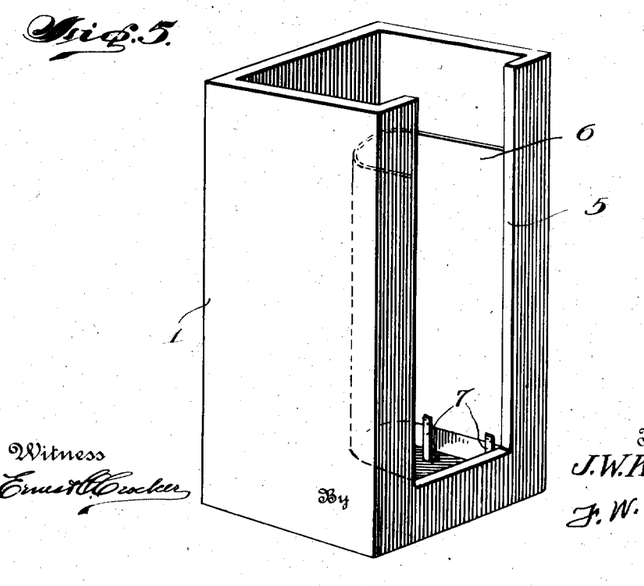
Fig. 5 is a detail perspective view of the double walled cork-lined tank which contains the ice and within which the ice cream container is placed.

The paper sack 34 is arranged to rest upon the plunger 35, said plunger being carried upon the screw threaded shaft 36, said shaft extending through a suitable bearing 37, a conical cap 38 being formed integral with the bottom of the double walled tank or casing and located around said bearing. The screw threaded shaft 36 passes through the nut 38, said nut being preferably formed integral with the bar 40, said bar being slidably mounted upon the lower extremities of the tie bars 41, which tie bars clamp the cap 11 in position as best shown in Fig. 3 of the drawings. Although the edges of the sheet metal cover 18 are soldered to the curved wall 6 for the purpose of forming a water tight joint between said curved wall and the cover 18, it has been found necessary to more securely attach the cap 11 owing to the pressure exerted against said cap when the plunger is operated and for this reason the tie bolts 41 are provided. The bar 42 is mounted upon the lower extremities of the tie bars 41 resting upon the heads 43 thereof and coil springs 44 are located around said tie bars between the bars 40 and 42, the bar 40 thus resting upon the coil springs. A beveled gear 45 is loosely mounted upon the screw threaded shaft 36 above the nut 38, said beveled gear being provided with a key 46 mounted in the key seat 47 which is provided in the screw threaded shaft.

A beveled pinion 48 meshes with the gear 45, said pinion being mounted upon a shaft 49, which is journaled in suitable bearings 50, suspended from the plate 51 which is attached to the under surface of the double walled tank 1. A ratchet 52 is fixedly mounted upon the shaft 49 and pivotally mounted upon said shaft and adjacent said ratchet wheel is a pair of spaced levers 53 between which is pivotally mounted a pawl 54 provided with a spring 55 arranged to normally hold said pawl in engagement with the ratchet 52, a link 56 being pivotally connected to the tail 57 of the pawl for the purpose of holding said pawl out of engagement with the ratchet when desired as will be hereinafter described. A crank 58 is mounted upon the extremity of the shaft 49 for the purpose of rotating said shaft to draw the plunger 35 back to the lowermost or initial position when the pawl 54 is held out of engagement with the ratchet 52. For the purpose of operating the ratchet and pawl mechanism above described, a link 59 is connected to the upper extremities of the levers 53, said link being connected at its other extremity to the foot lever 60, said foot lever being pivoted at 61 to the adjacent leg of the apparatus, a spring 62 being connected to said lever and to the bottom plate 51 for the purpose of normally holding the lever in the initial position.

The dispensing mechanism is carried upon the rectangular plate 63, said plate being connected to the plate 19 in any suitable and well known manner and provided with a central aperture 64 arranged to register with the aperture 20 in said plate 19. A hollow rectangular frame 65 is provided around the edges of the plate 63, said frame being filled with cork or other heat insulating material 66. A pair of horizontally disposed guide rods 67 are carried from opposite sides of the frame 65, each of said guide rods being provided at its outer extremity with an enlarged head 68, a brace 69 extending from each of said heads to the lower portion of the frame 65 for the purpose of supporting said guide rods. The dispensing cylinder 70 is provided at diametrically opposite points with trunnions 71 which are journaled in the sliding bearings 72, which bearings are slidably mounted upon the guide rods 67. The interior of the dispensing cylinder 70 may be of any cross sectional form and as shown in the drawings is a nine pointed star formed of a metallic sheet 73. This interior wall of the cylinder is preferably spaced from the outer wall, a packing 74 of cork or the like being interposed between the outer and inner walls. The outer end of the cylinder is closed by means of a plate 75 and the inner end thereof is open, a rectangular plate 76 being connected thereto, said plate having an inturned flange 77 around its edges, the upper flange being provided with a knife blade 78 for purposes hereinafter mentioned.

A rectangular plate 79 is located within the flanges 77 and slidably mounted upon the interior portion 73 of the dispensing cylinder, said plate being necessarily provided with an aperture of the same shape as the interior portion 73 of the cylinder. The plate 79 is provided at each corner with a screw threaded stud 80, which is loosely mounted within an aperture 81 formed in the end plate 76, a nut 82 being provided upon the outer extremity of the screw threaded stud and springs 83 being located between the end plate 76 and the movable plate 79 for the purpose of normally holding the movable plate in the position shown in Fig. 6 of the drawings. A rectangular plate 84 provided with a cylindrical aperture 85 of the same diameter as the aperture 64 is connected to the plate 63 in any suitable and well known manner and spaced from said plate 84 and connected within the frame 65 in any suitable manner is a plate 86 provided with an aperture 87, which is of the size and shape of the interior portion 73 of the dispensing cylinder. Slidably mounted between the plates 84 and 86 is a cut-off plate 88 arranged to normally close the neck 17 of the container cap and to be operated as will be later described.

Slidably mounted within the interior portion 73 of the dispensing cylinder is a plunger 89 formed to fit snugly within the star shaped interior of the cylinder, said plunger provided with a rod 90, which extends longitudinally within the interior of the cylinder and is slidably mounted into a central aperture 91 in the end plate 75 of the cylinder, a neck 92 being formed upon said end plate and forming a bearing for the rod. The end plate 75 and the neck 92 are provided with the slots 93 adapted to receive the pins 94, 95 and 96, as the rod is slidably passed through the aperture and neck as will be later described.

Figures 6, 11, 20:
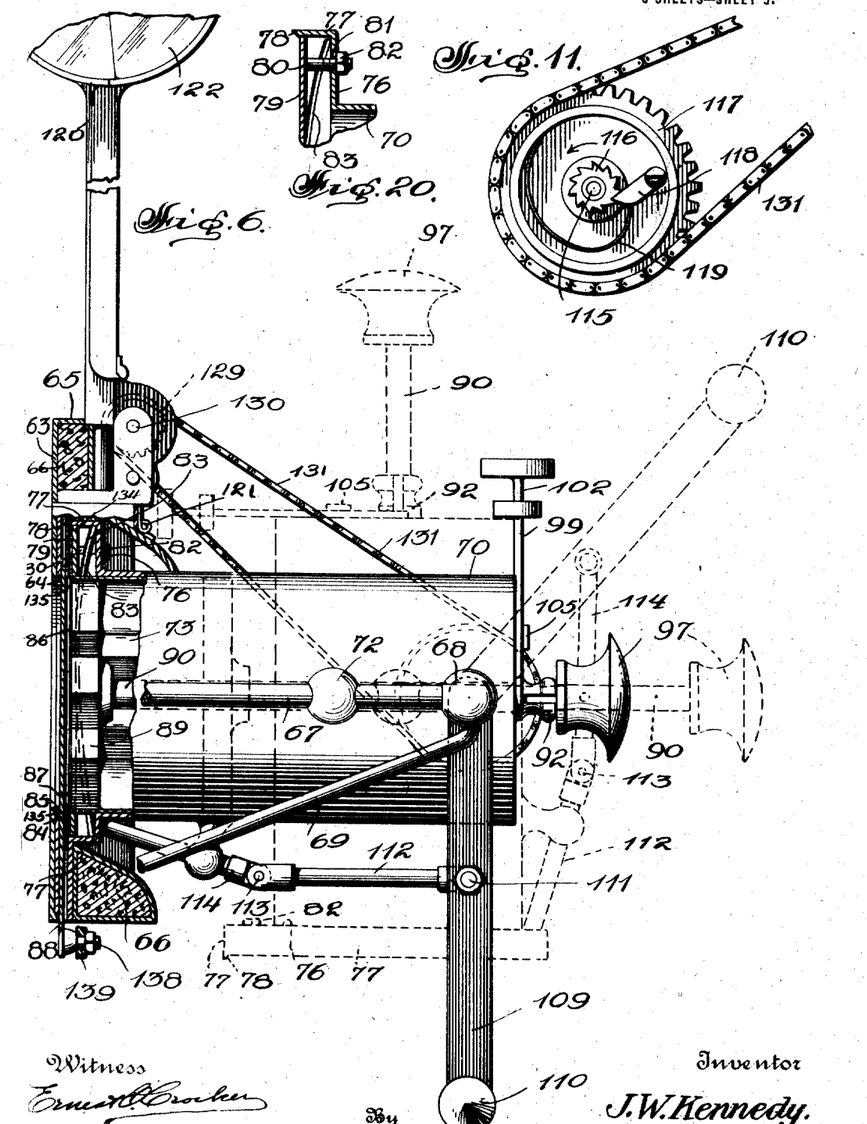
Fig. 6 is a side elevation partly in section of the dispensing mechanism showing the dispensing cylinder in dotted lines in the dispensing position.
Fig. 11 is a detail view of the ratchet and pawl upon the dispensing mechanism.
Fig. 20 is a fragmentary sectional view showing the means of retaining the spring pressed plate within the extremity of the dispensing cylinder.
Figure 7:
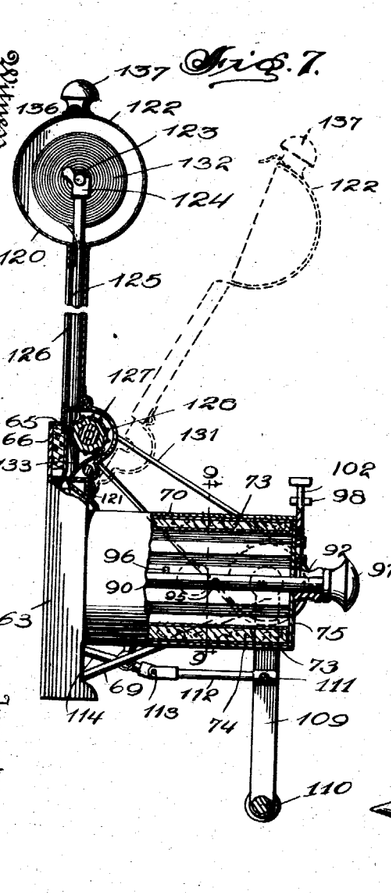
Fig. 7 is a side elevation of the dispensing mechanism on a smaller scale, parts being broken away for the purpose of illustration.
Figures 8, 9, 10:
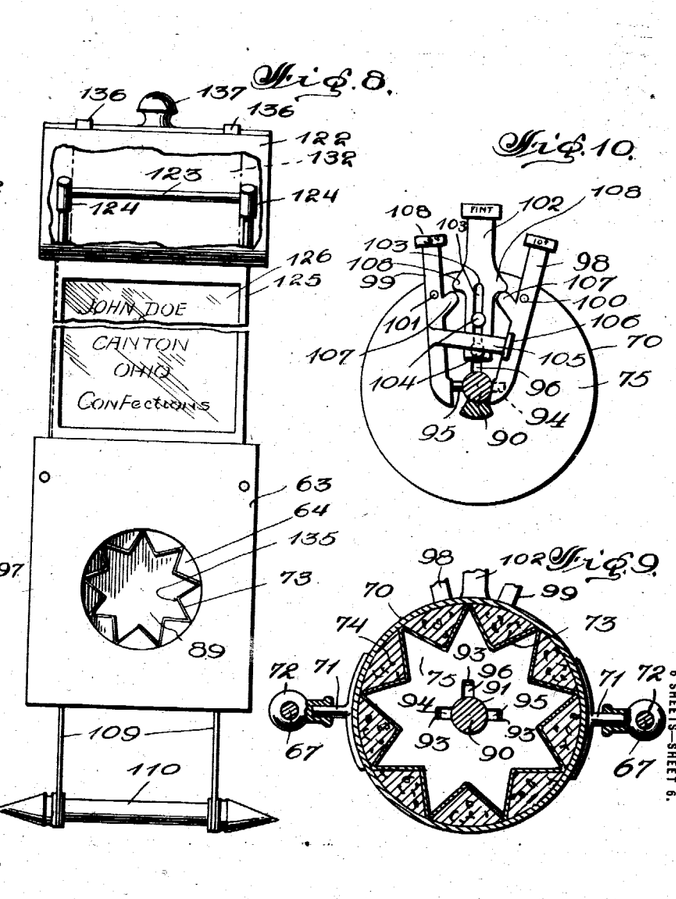
Fig. 8 is a rear elevation of the dispensing mechanism, parts being broken away for the purpose of illustration.
Fig. 9 is a section on the line 9—9, Fig. 7.
Fig. 10 is a detail view of the mechanism controlling the amount of ice cream dispensed.

As best shown in Fig. 7 of the drawings, the pin 94 is located a short distance from the rear end of the rod, the pin 95 is located upon the diametrically opposite side of the rod and for a considerably farther distance over the end than the pin 94 and the pin 96 is located upon the upper side of the rod at about half the distance between the extremities thereof. A knob 97 is provided upon the rear extremity of the rod 90 and arranged to contact with the neck 92 when the plunger is in the normal position as best shown in Figs. 6 and 7. For the purpose of automatically dispensing a predetermined amount of cream a series of operating keys arranged to co-act with the pins 94, 95 and 96 are mounted upon the end plate 75 of the cylinder, the keys 98 and 99 being pivotally mounted at 100 and 101 respectively upon the plate 75 and arranged to co-act with the pins 94 and 95 respectively. The key 102 is provided with an elongated slot 103, which frictionally engages the spaced pins 104, said key being arranged to co-act with the pin 96. The key 99 is provided with a finger 105, which is raised above the surface of the key 102 and is arranged to contact with an ear 106 on the key 98 and each of the keys 98 and 99 is provided with a finger 107 arranged to engage with a lug 108 carried upon the adjacent side of the key 102. With this construction of keys, it will be seen that only one of the keys may be moved into position to engage the corresponding pin as each key when moved into operative position will automatically move the other keys out of the operative position.

A pair of operating levers 109 are pivotally mounted upon the knobs 68, said levers being connected at their outer extremities by means of a handle 110. A tie bar 111 connects the levers 109 intermediate their extremities and pivotally connected to said tie bars, is a link 112, said link being pivotally connected at 113 to the rod 114, which is rigidly connected to the dispensing cylinder. One of the levers 109 is pivotally mounted through the adjacent knob 68 by means of a shaft 115, said shaft having fixedly connected to its outer extremity a ratchet wheel 116, a sprocket wheel 117 being loosely mounted upon said shaft between the knob 68 and the ratchet wheel. A spring pressed pawl 118 is pivotally mounted upon the sprocket wheel and arranged to be held in engagement with the ratchet wheel by means of the spring 119 when the ratchet wheel is rotated in the direction of the arrow shown in Fig. 11.

A casing 120 formed of two sections hinged together at 121 is mounted above the dispensing mechanism, said casing comprising the barrel portion 122 provided with a reel 123 mounted in suitable bearings 124, and the restricted portion 125, said restricted portion being provided upon the side toward the counter of the soda fountain with a glass panel 126. A corrugated roller 127 is journaled in the lower portion of the casing and provided with pins 128 around its periphery. A sprocket 129 is mounted upon the shaft 130 of the roller 127, a sprocket chain 131 connecting said sprocket with the sprocket 117. The reel 123 is arranged to receive a roll 132 of paraffined paper, the free end of said roll of paper arranged to be passed through the restricted portion 125 of the casing and provided with advertising matter arranged to be displayed through the glass panel 126, said paper passing the corrugated roller 127 and being located through the guide passage 133 and down through the narrow space 134 which is formed between the plates 79 and 86. The inner edge of the metallic sheet forming the interior portion 73 of the dispensing cylinder is sharpened as indicated at 135 forming a knife which cuts a star shaped piece from the roll of paper as will be further described. Spring clips 136 are provided upon the hinged portion of the casing for the purpose of normally holding said hinged portion in the closed position, a knob 137 being provided thereon for the purpose of opening said hinged portion as desired.

Pivotally connected to the cut off plate 88 at 138 is a lever 139, said lever being pivotally connected at one extremity to a link 140, said link being pivoted at 141 to one of 139 the front plates 22, spaced pins 142 limiting the movement of said link. The other extremity of the lever 139 is pivotally connected at 143 to the link 144, the lower extremity of said link being provided with a short roller 145, a relatively longer roller 146 being spaced a short distance above said short roller. A cam 147 is provided upon the link 144 near the lower extremity thereof and arranged to engage a pin 148 which is fixedly mounted in the lower front plate 21. A foot lever 149 provided with a pedal 150 is pivotally mounted intermediate its ends upon a bracket 151 suspended from the bottom plate 51, said foot lever being located between the rollers 145 and 146, a spring 152 being connected to the forward end of the foot lever and to the bottom plate 51 for the purpose of normally holding said lever in the initial position.

The rear extremity of the lever 149 is located in a slot 153 formed in the lower extremity of the link 154, said link being pivotally connected at its upper extremity to a lever 155 which is pivoted at 156 to the rear face of the double walled casing or tank, said lever carrying a pawl 157 arranged to engage the ratchet wheel 16 provided upon the worm screw 13. At the lower extremity of the double walled tank is provided an outlet pipe 158 having therein a trap 159, said pipe being arranged to carry off the water from the ice compartment of the tank.

In operating the above described apparatus the plunger 35 is first moved to the lowermost limit of its movement, this being accomplished by raising the tail of the pawl 54, the rod 56 being moved into position to rest upon the floor holding said pawl out of engagement with the ratchet 52, the handle 58 being then rotated and through the pinion 48 and gear 45 the screw 36 is operated in a direction to lower the plunger. The door 23 is then opened and the container 27 within which is contained the ice cream or other substance to be dispensed, said substance being confined within the collapsible sack 34, is placed within the tank, the upper edge of the container being seated within the annular groove 30 within the cap 11 after which the locking cams 29 are operated to hold the container fixedly in the position shown in the drawings. The pawl 54 is then released allowing the same to be thrown into engagement with the ratchet 52.

The foot lever 60 should then be depressed rotating the pinion shaft 49 by means of the ratchet and pawl and in turn rotating the beveled gear 45, raising the screw threaded shaft 36 which carries the plunger 35, forcing the ice cream up into the concaved cap 11 and around the worm 13, the knife blades 33 cutting said ice cream at substantially the same angle as the blades upon the worm. This operation should be repeated as often as any cream is dispensed from the upper end of the container thus always keeping the worm entirely surrounded by the ice cream.

The keys 98, 99, and 102 are then operated to engage the desired pin upon the rod of the plunger 89 in order to allow the desired amount of ice cream to be dispensed into the dispensing receptacle. The foot lever 150 is then depressed, drawing the link 144 down and through the lever 139, moving the cut off plate 88 away from the aperture in the neck of the container cap. As the cut off plate is moved out of engagement with the aperture the link 22 by means of the cam 147 and pin 148 is moved into a position to throw the roller 145 upon said rod out of engagement with the foot lever 149 allowing the foot lever to descend farther without moving the link 22. As the foot lever continues to descend the rear extremity of said lever which has traveled through the slot 153 in the link 154 raises said link and causes the pawl 157 to operate the ratchet 16, thereby rotating the worm 13 in a direction to feed the contents of the cap into the dispensing receptacle.

As the cream is thus fed into the dispensing receptacle a sheet of paper which has been cut by means of the knife 135 as will be hereinafter explained is pushed through the interior of the container ahead of the cream thus cleaning the interior of the dispensing cylinder. The cream forces the plunger back into the dispensing receptacle until the proper pin upon the rod 90 engages the key which has been set to determine the amount of cream to be dispensed. As the foot lever 149 is released the spring 152 will move the same back into the normal position, said lever striking the long roller 146 and moving the link 122 back to the position closing the cut-off plate 88.

The handle 110 of the dispensing receptacle is then moved into the position shown in Fig. 6 rocking the dispensing receptacle into a vertical position and a plate or saucer or other suitable dish or receptacle is placed beneath the open end of the dispensing receptacle and the plunger 89 moved downwardly by means of the knob 97, discharging the cream in the form in which it has been molded in the dispensing receptacle into the dish or other receptacle placed to receive the same. The paper is then removed from the top of the molded cream, thus discharged, and the cream is ready to serve in a clean and sanitary condition and in a pleasing form.

As the dispensing receptacle is moved back into the normal position the sprocket 117 will be operated by means of the ratchet and pawl 116 and 118 and through the chain 131 and sprocket 129, the corrugated roller 127 will be rotated, said roller acting upon the paper from the roll 132 and moving said paper down through the guide 133 and between the plate 86 and the spring pressed plate 79, said spring pressed plate catching the strip of paper and holding the same in position as the dispensing receptacle reaches the normal position the knife edge 78 shearing said strip of paper and the knife edge 135 cutting a star shaped piece from said paper. The piece of paper which is cut by the knife edge 78 and from which the star shaped portion is cut is allowed to drop out of the device as the dispensing receptacle is moved again into the discharging position. This paraffined paper is provided with an advertisement upon one side of the paper which is arranged to be displayed between the glass panel 126 as the dispensing apparatus is operated.

It will be seen that as the plunger 89 is moved downwardly to discharge the cream the star shaped paper upon the top of the cream will clean the interior of the dispensing receptacle, thus keeping this part of the device always clean and sanitary. Attention is also called to the fact that all parts of the device are sealed at all times during the operation thereof, thereby obviating the necessity of washing the parts after each operation, and doing away with the usual vessel of wash water which is used in the present method of dispensing ice-cream and which in itself is uncleanly and unsanitary.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. An apparatus for dispensing semi-solid substances comprising a container surrounded by a cooling chamber and provided with an outlet aperture near one extremity, a cut-off provided for said outlet aperture, means for forcing the contents of the container toward said extremity, a worm for forcing the contents transversely across said extremity through the aperture, means for automatically opening the cut-off before the worm is operated, a dispensing receptacle mounted adjacent said aperture for receiving the contents from the container, means for moving said dispensing receptacle into a vertical position after being filled and means for discharging the contents of said dispensing receptacle.

2. An apparatus for dispensing semi-solid substances comprising a container surrounded by a cooling chamber and provided with an outlet aperture near one extremity, a cut-off provided for said outlet aperture, means for forcing the contents of the container toward said extremity, a worm for forcing the contents transversely across said extremity through the aperture, means for automatically opening the cut-off before the worm is operated, a dispensing receptacle mounted adjacent said aperture for receiving the contents from the container, and means for predetermining the quantity of the contents to be received by said dispensing receptacle.

3. An apparatus for dispensing semi-solid substances, comprising a container surrounded by a cooling chamber and provided with an outlet aperture near one extremity, a cut-off provided for said outlet aperture, means for forcing the contents of the container toward said extremity, a worm for forcing the contents transversely across said extremity through the aperture, means for automatically opening the cut-off before the worm is operated and a dispensing receptacle mounted adjacent to said aperture for receiving the contents from the container.

4. An apparatus for dispensing semi-solid substances, comprising a container surrounded by a cooling chamber and provided with an outlet aperture near one extremity, means for forcing the contents of the container toward said extremity, a worm for forcing the contents transversely across said extremity through the aperture, horizontally disposed knife blades located adjacent the worm for separating said contents before it reaches the worm and a dispensing receptacle mounted adjacent to said aperture for receiving the contents from the container.

5. An apparatus for dispensing semi-solid substances, comprising a container surrounded by a cooling chamber and provided with an outlet aperture near one extremity, means for forcing the contents of the container toward said extremity, a worm for forcing the contents transversely across said extremity through the aperture, knife blades located adjacent said worm and disposed at the same angle as the blades of the worm for separating the contents before it reaches the worm and a dispensing receptacle mounted adjacent to said aperture for receiving the contents from the container.

6. An apparatus for dispensing semi-solid substances, comprising a container surrounded by a cooling chamber and provided with an outlet aperture at one extremity, means for forcing the contents of the container through said aperture, an open-ended dispensing receptacle mounted adjacent to said aperture for receiving the contents from said container, means for moving said dispensing receptacle away from said aperture for discharging the contents, a paper supply located adjacent said dispensing receptacle, means for cutting said paper when the dispensing receptacle is operated and means for passing the paper thus cut through the dispensing receptacle ahead of the contents to clean the receptacle.

7. An apparatus for dispensing semi-solid substances comprising a container surrounded by a cooling chamber and provided with an outlet aperture at one extremity, means for forcing the contents of the container through said aperture, an open-ended dispensing receptacle mounted adjacent to said aperture for receiving the contents from said container, means for moving said dispensing receptacle away from said aperture for discharging the contents, a paper supply located adjacent said dispensing receptacle, means for passing the paper before the open end of the dispensing receptacle with each operation of said dispensing receptacle and means for cutting said paper when the dispensing receptacle is operated and means for passing the paper thus cut through the dispensing receptacle ahead of the contents to clean the receptacle.

8. An apparatus for dispensing semi-solid substances comprising a container surrounded by a cooling chamber and provided with an outlet aperture at one extremity, means for forcing the contents of the container through said aperture, an open ended dispensing receptacle mounted adjacent to said aperture for receiving the contents from said container, a slidable plunger located within said dispensing receptacle, a rod provided upon said plunger and extending through the closed end of the container, a series of spaced stops provided upon said rod and a plurality of keys arranged to engage said stops to limit the amount of contents received into said receptacle.

9. An apparatus for dispensing semi-solid substances, comprising a container surrounded by a cooling chamber and provided with an outlet aperture at one extremity, means for forcing the contents of the container through said aperture, an open-ended dispensing receptacle mounted adjacent to said aperture for receiving the contents from said container, means for moving said dispensing receptacle away from said aperture for discharging the contents, a paper supply located adjacent said dispensing receptacle, means for passing said paper before said aperture when the dispensing receptacle is operated, means for cutting said paper when the dispensing receptacle is operated and means for passing the paper thus cut through the dispensing receptacle ahead of the contents to clean the interior of the dispensing receptacle.

In testimony that I claim the above, I have hereunto subscribed my name.

JAMES W. KENNEDY.